United States Patent
Park et al.

(10) Patent No.: US 9,974,016 B2
(45) Date of Patent: May 15, 2018

(54) POWER SAVE MODE-BASED OPERATION METHOD AND DEVICE IN WIRELESS LAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/113,398

(22) PCT Filed: Nov. 20, 2014

(86) PCT No.: PCT/KR2014/011153
§ 371 (c)(1),
(2) Date: Jul. 21, 2016

(87) PCT Pub. No.: WO2015/122600
PCT Pub. Date: Aug. 20, 2015

(65) Prior Publication Data
US 2017/0013555 A1    Jan. 12, 2017

Related U.S. Application Data

(60) Provisional application No. 61/938,155, filed on Feb. 11, 2014, provisional application No. 61/942,590, (Continued)

(51) Int. Cl.
*G08C 17/00* (2006.01)
*H04W 52/02* (2009.01)
*H04W 84/12* (2009.01)

(52) U.S. Cl.
CPC ... *H04W 52/0216* (2013.01); *H04W 52/0225* (2013.01); *H04W 84/12* (2013.01); *Y02B 60/50* (2013.01)

(58) Field of Classification Search
None
See application file for complete search history.

(56) References Cited

U.S. PATENT DOCUMENTS

2007/0230418 A1   10/2007 Takeuchi et al.
2012/0250596 A1*  10/2012 Park ............... H04W 52/0219
                                                        370/311
(Continued)

FOREIGN PATENT DOCUMENTS

JP    2005323357    11/2005
JP    20055323357   11/2005
(Continued)

OTHER PUBLICATIONS

PCT International Application No. PCT/KR2014/011153, International Search Report dated Jan. 21, 2015, 6 pages.
(Continued)

*Primary Examiner* — Lonnie Sweet
(74) *Attorney, Agent, or Firm* — Lee Hong Degerman Kang Waimey

(57) ABSTRACT

A power save mode-based operation method and device in a wireless LAN are disclosed. The power save mode-based operation method and device in a wireless LAN can comprise the steps of: transmitting, by an STA, a first trigger frame to an AP in a first service interval; receiving, by the STA, a downlink frame transmitted by the AP on the basis of the first trigger frame in the first service interval; receiving, by the STA, traffic indication information from the AP in a second service interval after reception of the downlink frame; determining, by the STA, whether a pending downlink frame of the AP exists on the basis of the traffic
(Continued)

indication information in the second service interval; and determining, by the STA, a mode for saving power on the basis of whether the pending downlink frame exists.

10 Claims, 13 Drawing Sheets

Related U.S. Application Data filed on Feb. 20, 2014, provisional application No. 61/982,351, filed on Apr. 22, 2014, provisional application No. 62/035,514, filed on Aug. 11, 2014.

(56) References Cited

U.S. PATENT DOCUMENTS

| | | | | |
|---|---|---|---|---|
| 2013/0051293 A1* | 2/2013 | Wentink | ............ | H04W 52/0216 |
| | | | | 370/311 |
| 2013/0235773 A1* | 9/2013 | Wang | ................ | H04W 52/0206 |
| | | | | 370/311 |
| 2014/0010152 A1* | 1/2014 | Park | .................... | H04W 28/065 |
| | | | | 370/328 |
| 2015/0219742 A1* | 8/2015 | Castagnoli | .............. | H04W 4/02 |
| | | | | 370/336 |
| 2015/0223169 A1* | 8/2015 | Ghosh | ............... | H04W 52/0216 |
| | | | | 370/311 |
| 2016/0073340 A1* | 3/2016 | Xue | .................. | H04W 52/0212 |
| | | | | 455/522 |
| 2016/0262169 A1* | 9/2016 | Das | ................... | H04W 72/1215 |

FOREIGN PATENT DOCUMENTS

| | | |
|---|---|---|
| JP | 2013251739 | 12/2013 |
| JP | 2014525716 | 9/2014 |
| KR | 10-2006-0105187 | 10/2006 |
| KR | 10-2011-0109992 | 10/2011 |
| KR | 10-2012-0041144 | 4/2012 |
| KR | 10-2013-0041813 | 4/2013 |
| WO | 2013032657 | 3/2013 |
| WO | 2013073920 | 5/2013 |
| WO | 2013077653 | 5/2013 |
| WO | 2015119360 | 8/2015 |

OTHER PUBLICATIONS

Japan Patent Office Application No. 2016-538079, Office Action dated Jun. 13, 2017, 6 pages.

* cited by examiner

FIG. 1
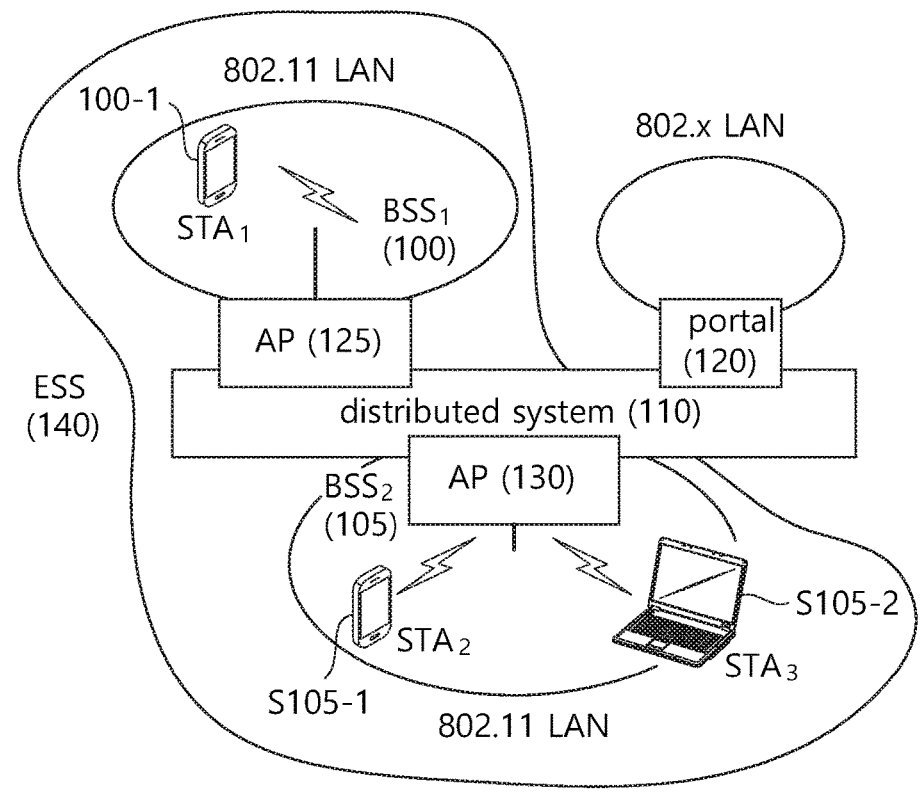
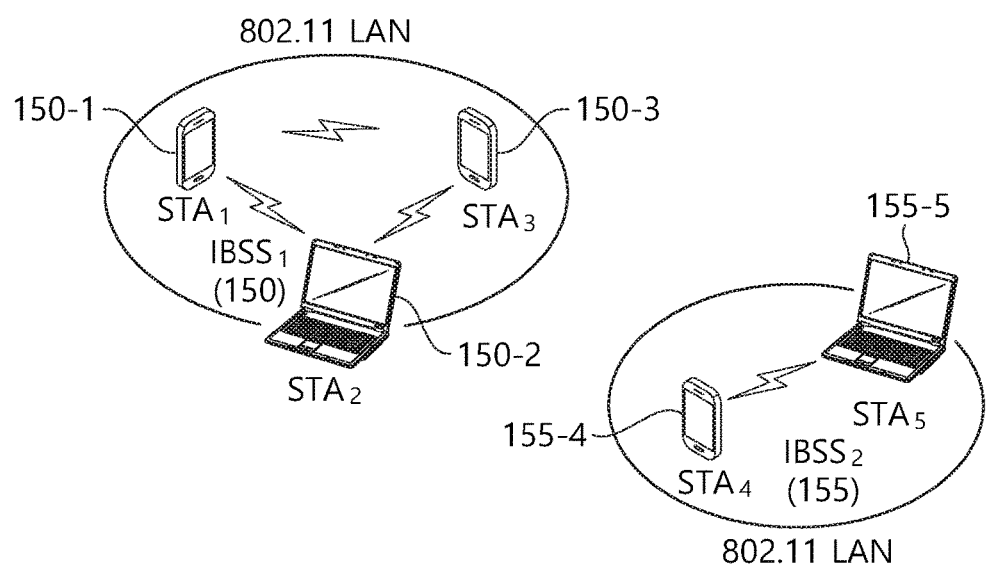

POWER SAVE MODE-BASED OPERATION METHOD AND DEVICE IN WIRELESS LAN

CROSS-REFERENCE TO RELATED APPLICATIONS

This application is the National Stage filing under 35 U.S.C. 371 of International Application No. PCT/KR2014/011153, filed on Nov. 20, 2014, which claims the benefit of U.S. Provisional Application No. 61/938,155, filed on Feb. 11, 2014, 61/942,590, filed on Feb. 20, 2014, 61/982,351, filed on Apr. 22, 2014, and 62/035,514, filed on Aug. 11, 2014 the contents of which are all hereby incorporated by reference herein in their entirety.

BACKGROUND OF THE INVENTION

Field of the Invention

The present invention relates to wireless communications, and more particularly, to a method and an apparatus for an operation based on a power saving mode in a wireless local area network (WLAN).

Related Art

In IEEE 802.11, a power saving mechanism (or power saving mode) may be used to increase the life of a wireless local area network (WLAN) station (STA). An STA operating based on the power saving mode is capable of operating in an awake state or doze state in order to save power. The awake state is a state in which normal operations of the STA, such as frame transmission or reception or channel scanning, are possible. The doze state is a state in which power consumption is drastically reduced to make it impossible to transmit or receive a frame and to perform channel scanning. The STA operating in the power saving mode is usually in the doze state and switches to the awake state if necessary to reduce power consumption.

When the STA is operating for a long time in the doze state, power consumption of the STA is reduced. Accordingly, the life of the STA may increase. However, in the doze state, it is impossible to transmit or receive a frame. Thus, the STA may not stay for a long time in the doze state. When the STA has a pending frame in the doze state, the STA may switch to the awake state to transmit the frame to an AP. However, when the STA is in the doze state and the AP has a pending frame to transmit to the STA, the STA may not receive the pending frame from the AP and does not recognize that the AP has the pending frame. Accordingly, the STA may periodically switch to the awake mode to operate in order to acquire information on whether the AP has a pending frame and to receive the pending frame from the AP.

The AP may acquire information on an awake-mode operation timing of the STA and transmit information on whether the AP has a pending frame according to the awake-mode operation timing of the STA.

Specifically, the STA in the doze state may periodically switch from the doze state to the awake state to receive a beacon signal in order to receive information on whether there is a frame to receive from the AP. The AP may notify whether there is a frame to transmit to each STA based on a traffic indication map (TIM) included in the beacon frame. The TIM may be used to indicate the presence of a unicast frame to be transmitted to the STA, and a delivery traffic indication map (DTIM) may be used to indicate the presence of a multicast frame/broadcast frame to be transmitted to the STA.

SUMMARY OF THE INVENTION

An aspect of the present invention is to provide an operation method based on a power saving mode in a wireless local area network (WLAN).

Another aspect of the present invention is to provide an operation apparatus based on a power saving mode in a WLAN.

To achieve the aforementioned purposes of the present invention, an operation method based on a power saving mode in a WLAN according to one aspect of the present invention may include transmitting, by a station (STA), a first trigger frame to an access point (AP) in a first service interval; receiving, by the STA, a downlink frame transmitted by the AP based on the first trigger frame in the first service interval; receiving, by the STA, traffic indication information from the AP in a second service interval after receiving the downlink frame; determining, by the STA, whether there is a pending downlink frame in the AP based on the traffic indication information in the second service interval; and determining, by the STA, a mode for power saving based on whether there is the pending downlink frame, wherein the traffic indication information may include information on presence of the pending downlink frame to be transmitted by the AP in the second service interval.

To achieve the aforementioned purposes of the present invention, an STA operating based on a power saving mode in a WLAN according to another aspect of the present invention may include a radio frequency (RF) unit configured to transmit or receive a radio signal; and a processor operatively connected to the RF unit, wherein the processor may be configured to transmit a first trigger frame to an AP in a first service interval, to receive a downlink frame transmitted by the AP based on the first trigger frame in the first service interval, to receive traffic indication information from the AP in a second service interval after receiving the downlink frame, to determine whether there is a pending downlink frame in the AP based on the traffic indication information in the second service interval, and to determine a mode for power saving based on whether there is the pending downlink frame, and the traffic indication information may include information on presence of the pending downlink frame to be transmitted by the AP in the second service interval.

A new power saving mode is defined to increase real-time traffic transmission efficiency in a dense environment and to save power consumed by an STA.

BRIEF DESCRIPTION OF THE DRAWINGS

FIG. 1 is a conceptual view illustrating a structure of a wireless local area network (WLAN).

DESCRIPTION OF EXEMPLARY EMBODIMENTS

Figure 2:
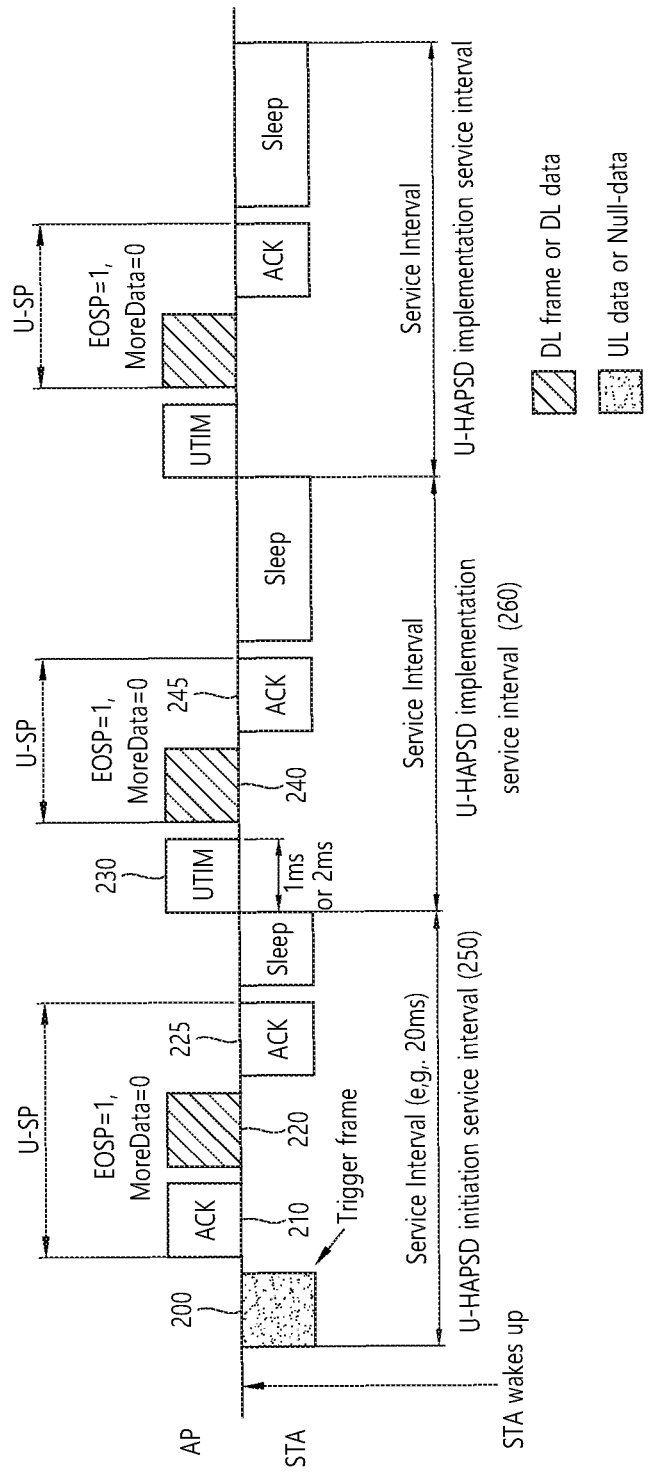
FIG. 2 is a conceptual view illustrating a U-HAPSD procedure according to an embodiment of the present invention.

FIG. 1 is a conceptual view illustrating a structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

In the following embodiments of the present invention, data (or a frame) transmitted from an AP to an STA may be represented by downlink data (or a downlink frame) and data (or a frame) transmitted from an STA to an AP may be represented by uplink data (or an uplink frame). Also, transmission from an AP to an STA may be represented by downlink transmission and transmission from an STA to an AP may be represented by uplink transmission.

An STA operating in an existing power saving mode in a WLAN may operate based on unscheduled automatic power save delivery (U-ASPD), scheduled automatic power save delivery (S-ASPD), and the like. When the STA uses U-APSD or S-APSD, it may be difficult for the STA to support a real-time application (for example, Voice over Internet Protocol (VoIP)).

According to U-APSD, a trigger frame is transmitted in each service interval. Accordingly, trigger frames transmitted from a great number of STAs may cause an increase in channel congestion in a dense environment. Specifically, when the STAs use U-APSD, the STAs may transmit uplink trigger frames to an AP at service intervals (or trigger intervals, for example, every 20 ms) to receive downlink data in order to satisfy a jitter requirement (for example, 30 ms) of a VoIP service. Transmissions of a great number of uplink trigger frames may cause signal flooding in a highly dense WLAN environment. Further, when STAs use S-APSD, it is difficult to perform scheduled transmission in a dense environment, and thus there is no downlink data in a service interval or power consumption of the STAs increases when transmission fails.

Hereinafter, an embodiment of the present invention discloses unscheduled hybrid automatic power save delivery (U-HAPSD) to solve problems of operations based on the existing power saving mode. U-HAPSD may be used to support a real-time service (for example, an interactive video service, a VoIP service, and the like)

When an STA uses U-HAPSD, the STA may be provided with a real-time application-based service without frequently transmitting an uplink trigger frame. Since the STA does not frequently transmit an uplink trigger frame, signal flooding may not occur. Further, when an STA uses U-HAPSD, power for the STA may be saved as compared with in operation based on the existing power saving mode. A transmission method based on a power saving mode according to an embodiment of the present invention may be referred to as unscheduled hybrid automatic power save delivery (U-HAPSD).

FIG. 2 is a conceptual view illustrating a U-HAPSD procedure according to an embodiment of the present invention.

Referring to FIG. 2, an STA using U-HAPSD may not transmit a trigger frame 200 to an AP in each service interval.

The STA may transmit the trigger frame 200 to the AP in a first service interval in order to initiate U-HAPSD-based communication. A service interval in which the STA transmits the trigger frame to initiate U-HAPSD-based communication may be referred to as a U-HAPSD initiation service interval 250. When the STA receives no downlink frame in the U-HAPSD initiation service interval 250, the STA may also set an interval following the first service interval as the U-HAPSD initiation service interval 250 and transmit the trigger frame 200 to the AP.

Specifically, the STA may transmit the trigger frame 200 to the AP to trigger transmission of a downlink frame transmitted by the AP in the U-HAPSD initiation service interval 250. When the AP successfully receives the trigger frame 200 from the STA, the AP may transmit an acknowledgement (ACK) frame 210 to the STA. After transmitting the ACK frame 210, the AP may transmit a downlink frame (for example, downlink data or a management frame) 220 to the STA after a certain period of time (for example, short inter-frame space (SIFS)). When the STA successfully receives the downlink frame 220 from the AP, the STA may transmit an ACK frame 225.

End of Service Period (EOSP) information included in the downlink frame 220 transmitted by the AP may indicate whether the service interval ends. When the EOSP information included in the downlink frame 220 indicates that the service interval ends (for example, EOSP=1), the STA may switch to a doze state (or sleep state) after transmitting the ACK frame 225 of the downlink frame 220 to the AP. Further, More Data information included in the downlink frame 220 may indicate whether there is additional data for the STA to receive. The More Data information equal to 0 may indicate that there is no additional downlink frame to receive in the service interval.

According to the embodiment of the present invention, the STA may perform a U-HAPSD traffic indication map (UTIM)-based operation after the U-HAPSD initiation service interval 250. A service interval in which the STA receives a UTIM 230 from the AP may be referred to as a U-HAPSD implementation service interval 260. The AP may transmit the UTIM 230 to the STA. Hereinafter, a frame carrying the UTIM 230 is referred to as a UTIM frame. The UTIM frame is a frame available from a previously defined WLAN frame, which may be a frame including information on the UTIM 230 or a frame newly defined for the UTIM 230. The UTIM may also be referred to as traffic indication information.

The UTIM frame may be transmitted by the AP to the STA within a certain period of time (for example 1 to 2 ms) from the start of the U-HAPSD implementation service interval 260 or the start of the service interval. The UTIM 230, as information defined for U-APSD-based frame exchanges, may include information on a pending downlink frame (downlink data) 240 to be transmitted by the AP to at least one STA through the service interval. The UTIM 230 may be a TIM defined for U-HAPSD. Specifically, the UTIM 230 used for U-HAPSD according to the embodiment of the present invention may be multicast information, unlike an existing broadcast TIM. The UTIM 230 may be information multicast to at least one STA using U-HAPSD. The UTIM 230 may include information on whether there is a pending downlink frame to be transmitted to an STA using U-HAPSD in various forms of information formats (for example, in a bitmap).

The STA may determine based on the UTIM frame whether the AP has the pending downlink data (downlink frame) 240. For example, the STA may acquire a UTIM identifier (ID) in a process of initially accessing the AP. When a UTIM ID included in the received UTIM frame indicates the UTIM ID of the STA, the STA may determine based on the received UTIM frame whether there is the pending downlink data 240. Specifically, when the UTIM ID included in an ID field of the UTIM frame is equal to the UTIM ID of the STA, the STA may further decode subsequent fields of the UTIM frame and acquire information on the downlink frame (or downlink data) 240 to receive.

When the UTIM frame indicates the presence of the pending downlink data 240 to be transmitted to the STA, the STA may maintain the awake state to monitor the downlink frame 240 in the U-HAPSD implementation service interval. The STA using U-HAPSD may monitor the downlink frame 240 transmitted through a medium without transmitting a separate frame (for example, a power save poll (PS-Poll) frame) after receiving the UTIM. On the contrary, when the UTIM frame indicates the absence of the pending downlink data 240 to be transmitted to the STA, the STA may switch from the awake state to the doze state and maintain the doze state in the remaining time resource in the U-HAPSD implementation service interval 260. That is, the STA may determine a power state based on the UTIM frame (or UTIM).

A power saving mechanism (or power saving mode) may be used to increase the life of a WLAN STA. An STA operating based on the power saving mode may determine a power state to operate either in the awake state or in the doze state in order to save power. The awake state is a state in which normal operations of the STA, such as frame transmission or reception or channel scanning, are possible. The doze state is a state in which power consumption is drastically reduced to make it impossible to transmit or receive a frame and to perform channel scanning. The STA operating in the power saving mode is usually in the doze state and switches to the awake state if necessary to reduce power consumption. The awake state may alternatively be referred to as an active mode, and the doze state may alternatively be referred to as a sleep mode. The active mode (or awake state) and the sleep mode (or doze state) may be modes for saving the power of the STA (power saving mode or power state).

In the U-HAPSD implementation service interval 260, the STA may also check EOSP information and/or More Data information in the received downlink frame 240, transmit an ACK frame 245 of the downlink frame 240, and determine whether to switch an operation state. That is, when the EOSP information and/or More Data information indicate that the service interval ends and/or that there is no downlink data to additionally receive, the STA may switch from the awake state to the doze state. On the contrary, when the EOSP information and/or More Data information indicate that the service interval does not end and/or that there is downlink data to additionally receive, the STA may maintain the awake state and monitor the medium.

That is, in an operation method based on the power saving mode in the WLAN, an STA may transmit a first trigger frame to an AP in a first service interval (U-HAPSD initiation service interval) and receive a downlink frame transmitted by the AP based on the first trigger frame in the first service interval. The STA may receive traffic indication information from the AP in a second service interval (U-HAPSD implementation service interval) after receiving the downlink frame, determine whether the AP has a pending downlink frame based on the traffic indication information in the second service interval, and determine a power state based on whether the AP has the pending downlink frame. The traffic indication information may include information on the pending downlink frame to be transmitted by the AP in the second service interval.

The U-HAPSD implementation service interval 260 may consecutively occur except in special circumstances. Special circumstances may include the retransmission of a downlink frame, the presence of a pending uplink frame, and the like, which will be described in detail below.

Figure 3:
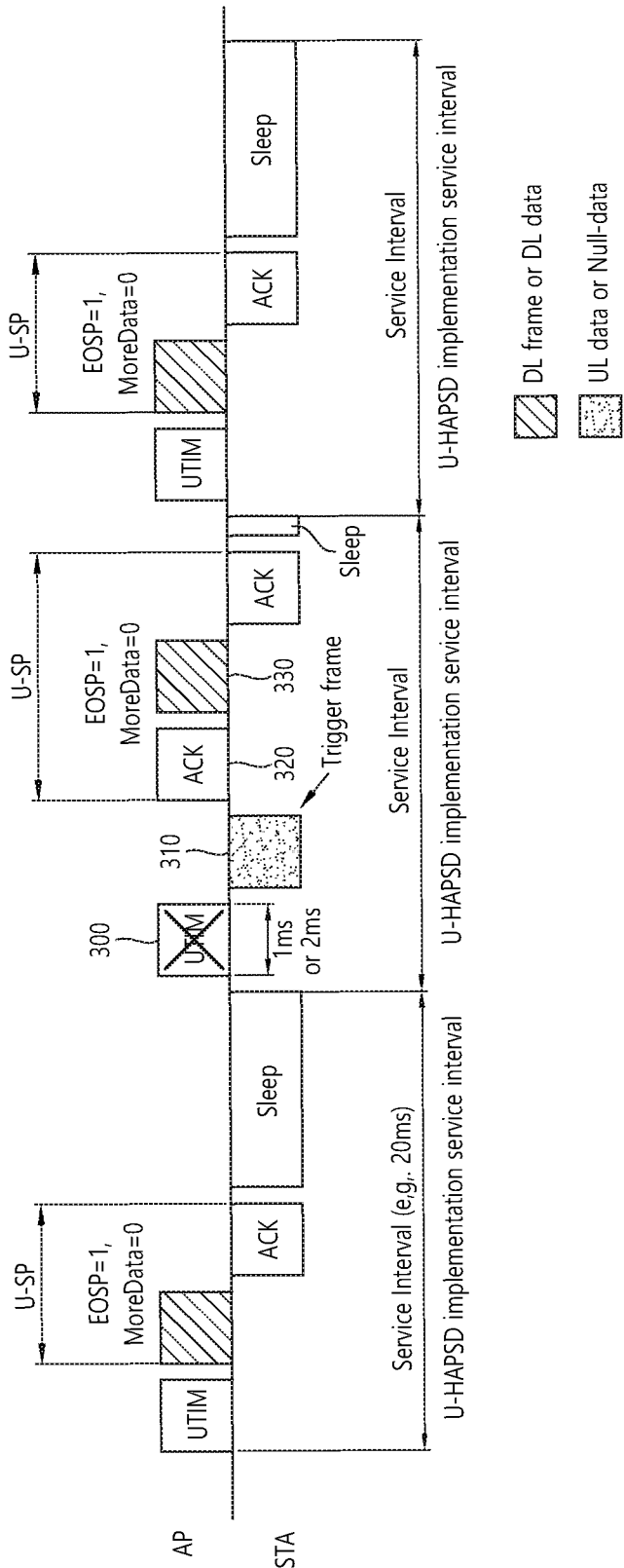
FIG. 3 is a conceptual view illustrating a U-HAPSD procedure according to an embodiment of the present invention.

FIG. 3 is a conceptual view illustrating a U-HAPSD procedure according to an embodiment of the present invention.

FIG. 3 illustrates operations of an STA and an AP when the STA fails to receive a UTIM in a U-HAPSD implementation service interval.

Referring to FIG. 3, when the AP fails in channel access and thus may not transmit a UTIM frame 300 or the STA fails to decode the UTIM frame 300, the STA may transmit a trigger frame 310 to the AP. The STA may determine a transmission timing of the trigger frame 310 in view of a transmission timing of the UTIM frame 300 from the AP in the U-HAPSD implementation service interval. For example, the transmission timing of the trigger frame 310 may be within SIFS after an estimated transmission timing of the UTIM frame in order to prevent another STA from occupying a medium. Alternatively, the transmission timing of the trigger frame 310 may be determined such that the trigger frame 310 is preferentially transmitted before a downlink frame, transmitted subsequently to the UTIM frame 300, is transmitted.

When the UTIM frame 300 is not transmitted to the STA within a certain period of time from the start of the U-HAPSD implementation service interval or decoding of the received UTIM frame 300 fails, the STA may generate and transmit the trigger frame 310 to the AP.

When the trigger frame 310 is received, the AP may transmit an ACK frame 320 to the STA, and may transmit a downlink frame to the STA when there is the pending downlink frame 330 to transmit to the STA.

Figure 4:
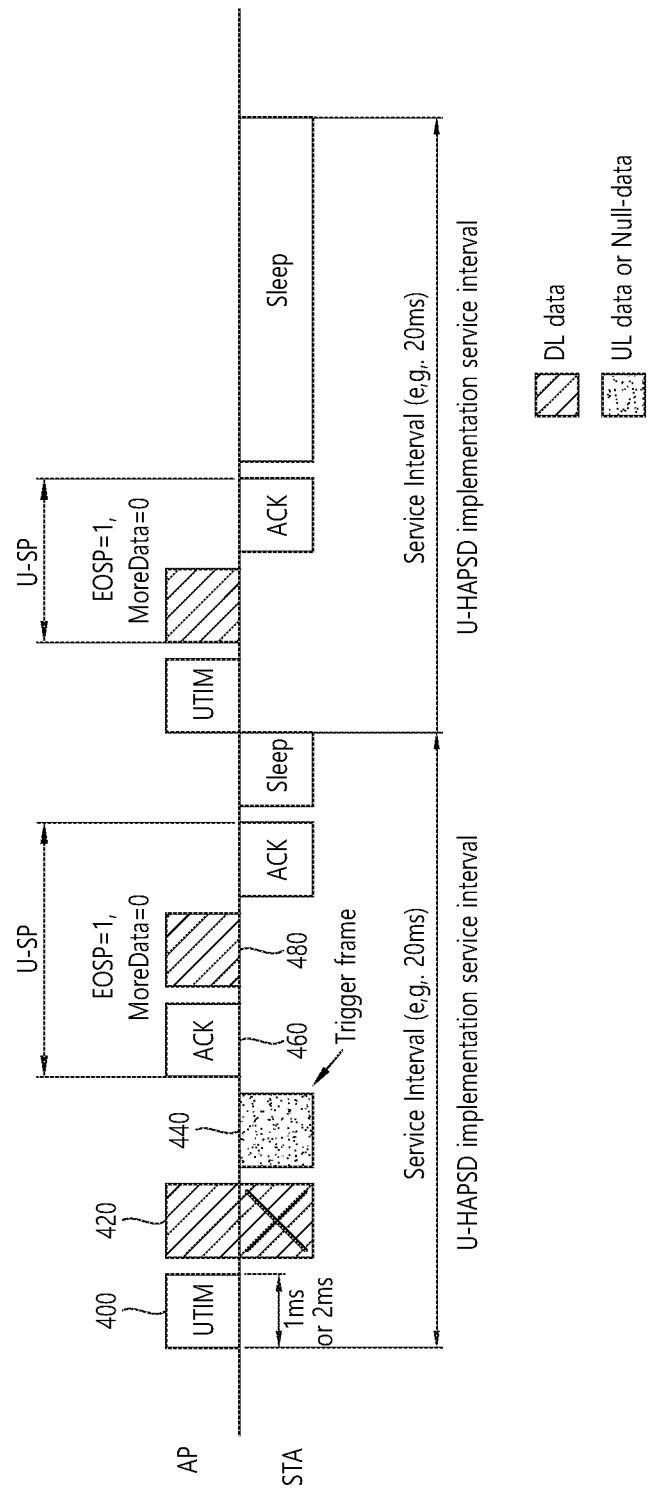
FIG. 4 is a conceptual view illustrating a U-HAPSD procedure according to an embodiment of the present invention.

FIG. 4 is a conceptual view illustrating a U-HAPSD procedure according to an embodiment of the present invention.

FIG. 4 illustrates operations of an STA and an AP when the STA fails to receive a downlink frame in a U-HAPSD implementation service interval.

Referring to FIG. 4, the AP fails in channel access and thus may not transmit a downlink frame 420 or the STA fails to decode the downlink frame 420, the STA may transmit a trigger frame 440 to the AP. The STA may determine a transmission timing of the trigger frame 440 in view of a transmission timing of the downlink frame 420 from the AP in the service interval. For example, the transmission timing of the trigger frame 440 may be within SIFS after an estimated transmission timing of the downlink frame in order to prevent another STA from occupying a medium.

When the STA does not receive the downlink frame 420 within a certain period of time after receiving a UTIM frame 400 or fails to decode the received downlink frame 420, the STA may generate and transmit the trigger frame 400 to the AP. The trigger frame 400 transmitted by the STA may include information indicating that failure of reception of the downlink frame 420 (or information indicating a request for retransmission of the downlink frame).

The AP receiving the trigger frame 400 may transmit an ACK frame 460 to the STA, and transmit a downlink frame 480 to the STA. The downlink frame 480, transmitted by the AP subsequently to the ACK frame 460, may be the same frame as the previous transmitted downlink frame 420 or be a retransmitted frame including part of data included in the previously transmitted downlink frame 420. Retransmission of the downlink frame is described in detail with reference to FIG. 5.

Figure 5:
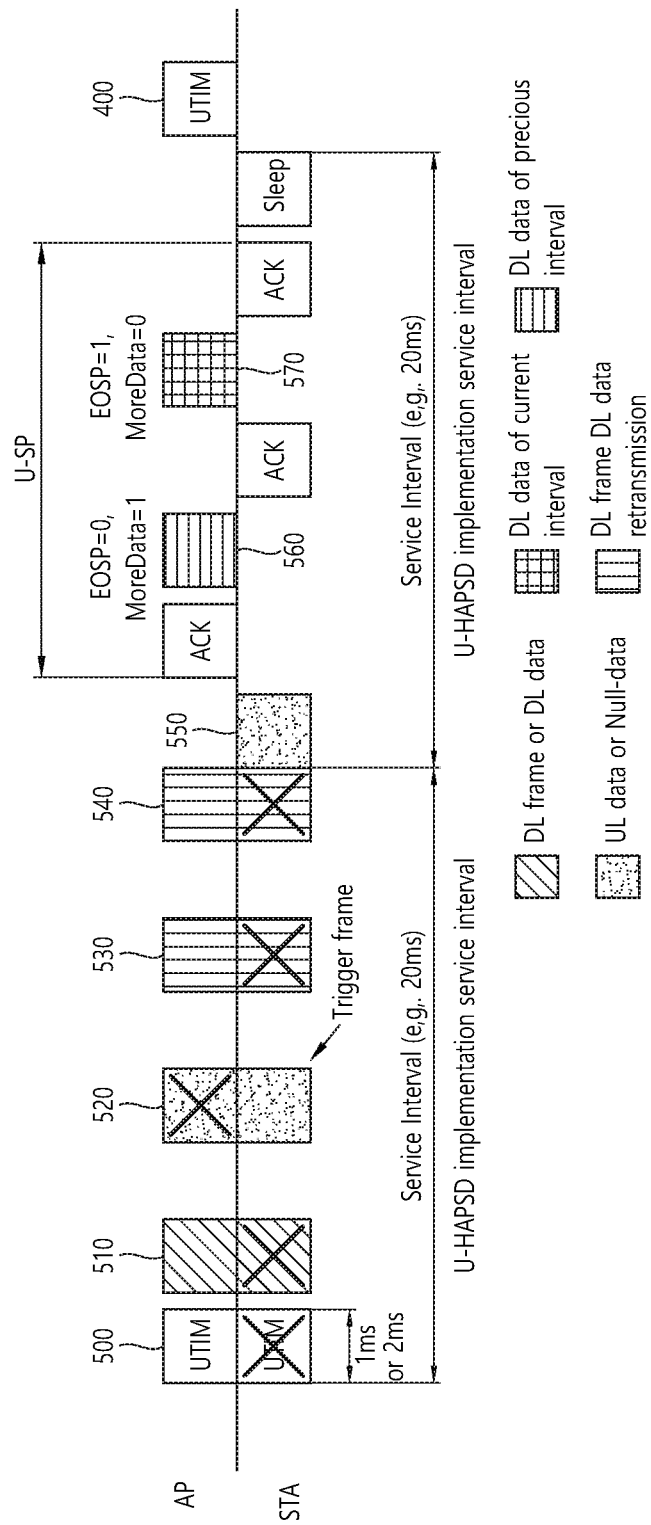
FIG. 5 is a conceptual view illustrating a U-HAPSD procedure according to an embodiment of the present invention.

FIG. 5 is a conceptual view illustrating a U-HAPSD procedure according to an embodiment of the present invention.

FIG. 5 illustrates that an AP retransmits a downlink frame 510 when an STA fails to receive a UTIM frame 500 and the downlink frame 510 and the AP fails to receive a trigger frame 520 transmitted by the STA in a U-HAPSD implementation service interval. Retransmission of the downlink frame 510 by the AP may also be performed in the same manner when only reception of the downlink frame fails.

Referring to FIG. 5, when the AP fails in channel access and thus may not transmit a UTIM frame 500 and the downlink frame 510 or the STA fails to decode the UTIM frame 500 and the downlink frame 510, the STA may transmit the trigger frame 520 to the AP. The AP may retransmit the downlink frame 510 previously transmitted when the AP receives neither an ACK frame of the downlink frame 510 nor the trigger frame 520.

The AP may retransmit the downlink frame 510 only a certain number of times or only in a certain time interval. For example, retransmission of the downlink frame 510 may be performed restrictively only within one U-HAPSD implementation service interval 580. When retransmission of the downlink frame 510 fails in the U-HAPSD implementation service interval, a subsequent service interval is set as a U-HAPSD initiation service interval 590, in which the AP may retransmit a downlink frame 560 to the STA only when the STA transmits a trigger frame 550.

Alternatively, the AP may retransmit the downlink frame 510 only up to a preset maximum number of retransmission times. When retransmission of the downlink frame 510 is performed up to the maximum number of retransmission times, the AP may not retransmit the downlink frame 510.

In view of a retransmission interval for the downlink frame 510 from the AP, the STA may monitor retransmitted downlink frames 530 and 540 in the retransmission interval. When retransmission of the downlink frame 510 is performed restrictively only in one service interval, a maximum retransmission interval for the downlink frame 510 may be up to the end of the current service interval. When retransmission of the downlink frame 510 is performed only up to the preset maximum number of retransmission times, the maximum retransmission interval for the downlink frame 510 may be a time required to perform retransmission of the downlink frame 510 the maximum number of retransmission times.

Hereinafter, it is assumed in the embodiment of the present invention that retransmission of a downlink frame is performed restrictively only in one service interval.

When the STA fails to decode the downlink frames 530 and 540 retransmitted by the AP in a first service interval (U-HAPSD implementation service interval 580), the STA may retransmit the trigger frame 550 to the AP in a second service interval (U-HAPSD initiation service interval 590). When the AP does not receive an ACK frame of the retransmitted downlink frames 530 and 540 from the STA in the first service interval (or when retransmission of the downlink frames fails), the AP may monitor the trigger frame 550 retransmitted from the STA in the second service interval.

When the AP receives the retransmitted trigger frame 550 in the second service interval, the AP may retransmit the downlink frame 560 in the second service interval. When the AP has additional pending downlink data (or downlink frame) 570 to transmit to the STA, the retransmitted downlink frame 560 may indicate the presence of the pending downlink data to be subsequently transmitted. For example, in the retransmitted downlink frame 560, EOSP information may be 0 and More Data information may be 1. The STA may recognize the presence of the downlink data pending in the AP based on the EOSP information and/or More Data information in the retransmitted downlink frame 560. In the presence of the additional downlink data pending in the AP, the STA may maintain the awake mode and monitor another downlink frame 570 transmitted from the AP.

Figure 6:
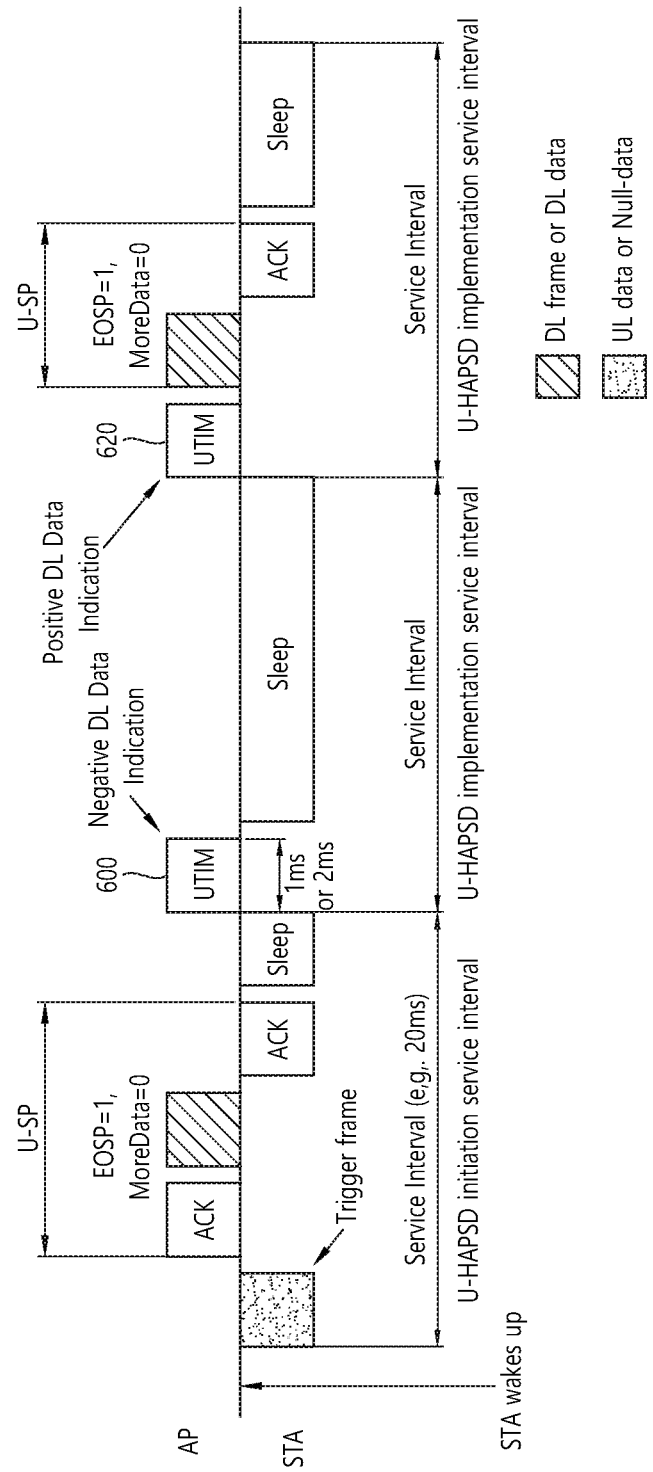
FIG. 6 is a conceptual view illustrating a U-HAPSD procedure according to an embodiment of the present invention.

FIG. 6 is a conceptual view illustrating a U-HAPSD procedure according to an embodiment of the present invention.

FIG. 6 illustrates an operation of an STA when a UTIM frame transmitted to the STA in a U-HAPSD implementation service interval following a U-HAPSD initiation service interval indicates that there is no downlink data (downlink frame) pending for the STA.

Referring to FIG. 6, the UTIM 600 transmitted from an AP may indicate that there is no downlink data pending for the STA. For example, the UTIM 600 may indicate in a virtual bitmap whether there is downlink data pending for the STA.

In this case, the STA may switch from the awake state to the doze state to reduce power consumption.

Figure 7:
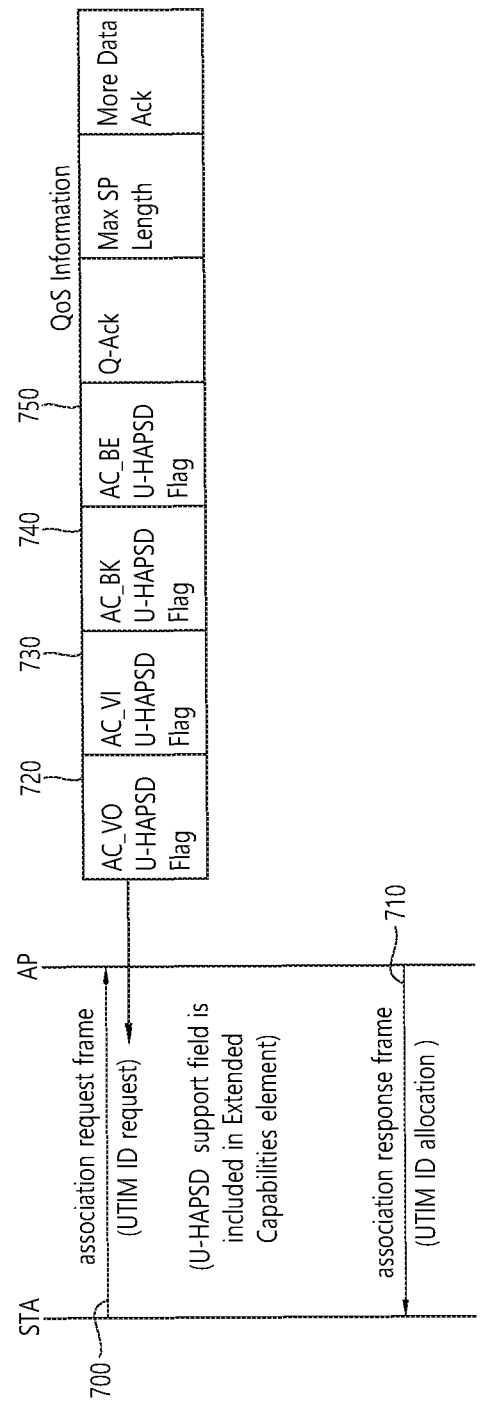
FIG. 7 is a conceptual view illustrating a method of assigning a UTIM ID of an STA according to an embodiment of the present invention.

FIG. 7 is a conceptual view illustrating a method of assigning a UTIM ID of an STA according to an embodiment of the present invention.

The STA may determine based on a UTIM ID whether a UTIM transmitted by an AP is a UTIM for the STA. A UTIM ID of the STA may be determined based on various methods. For example, the STA may be assigned a UTIM ID by the AP in an initial access step or be assigned a UTIM ID upon initiation of U-HAPSD-based communication. The UTIM ID may be a partial association identifier (PAID) of the STA or a medium access control (MAC) address of the STA.

When the UTIM ID is the PAID, the STA may determine whether a UTIM included in a UTIM frame is for the STA based on PAID information included in a signal field (for example, HE-SIG-A field) of a physical layer convergence procedure (PLCP) protocol data unit (PPDU) carrying the UTIM frame.

When the UTIM ID is the MAC address, the STA may check a receiving address (RA) field of an MAC header of the UTIM frame. The STA may determine whether the MAC header of the UTIM frame indicates the MAC address of the STA and determine whether the UTIM included in the UTIM frame is for the STA.

The UTIM ID may be defined as separate identification information other than the PAID or MAC address, and the STA may determine whether the UTIM included in the UTIM frame is for the STA based on UTIM ID information included in a signal field (for example, HE-SIG-A field) of a PPDU carrying the UTIM frame FIG. 7 illustrates a method of assigning a UTIM ID by the AP in the initial access step. The initial access step may include a scanning step, an authentication step, and an association step, and a UTIM ID may be assigned to the STA in the association step.

Referring to FIG. 7, the STA may transmit an association request frame 700 to the AP. The association request frame 700 may include information on U-HAPSD capability of the STA. For example, an extended capabilities element included in the association request frame 700 may include information indicating that U-HAPSD is available. Further, QoS information included in the association request frame 700 may include information indicating whether U-HAPSD is available by access category (AC). An AC may be used to set different traffic transmission priorities. For example, the AC of traffic may be determined to be one of AC_VO (voice), AC_VI (video), AC_BE (best effort), and AC_BK (background), and channel access may be performed based on different channel access parameters depending on traffic ACs.

Specifically, the QoS information in the association request frame 700 may include information on availability of U-HAPSD for AC_VO 720, information on availability of U-HAPSD for AC_VI 730, information on availability of U-HAPSD for AC_BK 740, and information on availability of U-HAPSD for AC_BE 750. That is, availability of U-HAPSD may be determined by ACs.

The AP may transmit an association response frame 710 to the STA to assign a UTIM ID. As described above, the UTIM ID assigned by the AP may be the PAID, MAC address, or the separate identification information for the UTIM. When the UTIM ID is the PAID or MAC address, the association response frame 710 may not separately transmit information on the UTIM ID.

A UTIM transmission interval may be a predetermined time interval of 1 or 2 ms from the start of a service interval, and information on the UTIM transmission interval may also be transmitted by the AP to the STA. The AP may transmit the information on the UTIM transmission interval to the STA through a frame (for example, the association response frame 710) transmitted in the initial access procedure of the STA.

Figure 8:
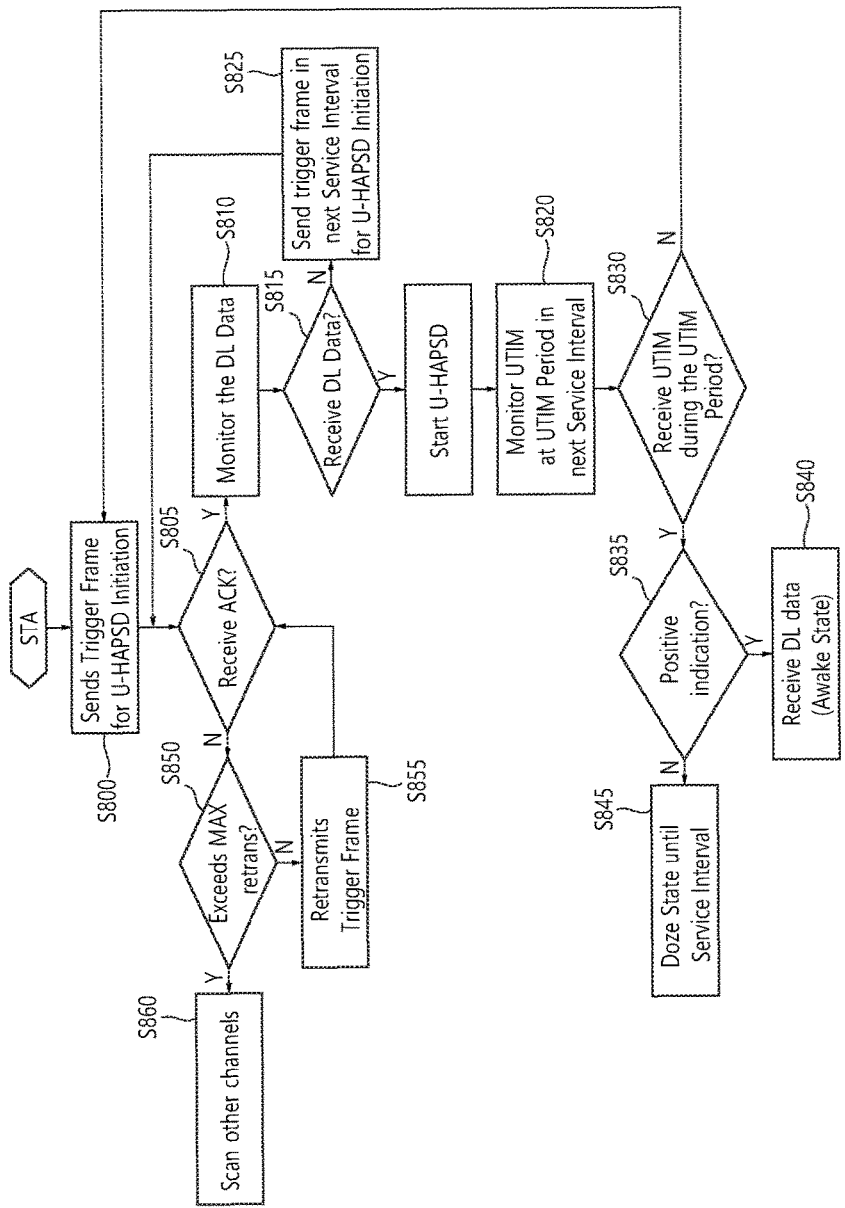
FIG. 8 is a conceptual view illustrating an operation of an STA using U-HAPSD according to an embodiment of the present invention.

FIG. 8 is a conceptual view illustrating an operation of an STA using U-HAPSD according to an embodiment of the present invention.

Referring to FIG. 8, the STA may transmit a trigger frame to an AP.

The STA may transmit the trigger frame in a U-HAPSD initiation service interval (step S800). The trigger frame may be used for initiation of a U-HAPSD procedure.

When the STA receives an ACK frame of the trigger frame from the AP in the U-HAPSD initiation service interval (step S805), the STA may monitor a downlink frame transmitted by the AP (step S810).

When the STA receives the downlink frame in the U-HAPSD initiation service interval (step S815), the STA may set a subsequent service interval as a U-HAPSD implementation service interval and monitor a UTIM transmitted in a UTIM transmission interval of the U-HAPSD implementation service interval (step S820).

When the STA receives no downlink frame (or downlink data) in the U-HAPSD initiation service interval (step S815), the STA may set a service interval subsequent to the U-HAPSD initiation service interval as a U-HAPSD initiation service interval again and transmit a trigger frame (step S825).

That is, the service interval subsequent to the U-HAPSD initiation service interval may be set as either a U-HAPSD initiation service interval or a U-HAPSD implementation service interval depending on whether the STA receives the downlink frame (downlink data) from the AP in the U-HAPSD initiation service interval (step S815).

When the STA receives the UTIM in the UTIM transmission interval of the U-HAPSD implementation service interval (step S830) and the UTIM indicates the presence of downlink data pending for the STA (step S835), the STA may monitor and receive a downlink frame transmitted from the AP in the awake state (step S840).

When the STA receives the UTIM in the UTIM transmission interval of the U-HAPSD implementation service interval (step S830) and the UTIM indicates the absence of downlink data pending form the STA, the STA may switch from the awake state to the doze state and maintain the doze state in a service interval after receiving the UTIM (step S845).

When the STA receives no ACK frame of the transmitted trigger frame (step S805), the STA may retransmit the trigger frame to the AP. The STA may determine whether the trigger frame is retransmitted to the AP a set maximum number of retransmission times (step S850) and retransmit the trigger frame to the AP (step S855).

That is, when the trigger frame is not retransmitted the set maximum number of retransmission times (step S850), the STA may transmit the trigger frame up to the maximum number of retransmission times to receive the ACK frame of the trigger frame is (step S855).

When the STA does not receive the ACK frame of the trigger frame and retransmits the trigger frame to the AP the set maximum number of retransmission times, the STA may scan another channel for U-HAPSD-based communication (step S860).

Figure 9:
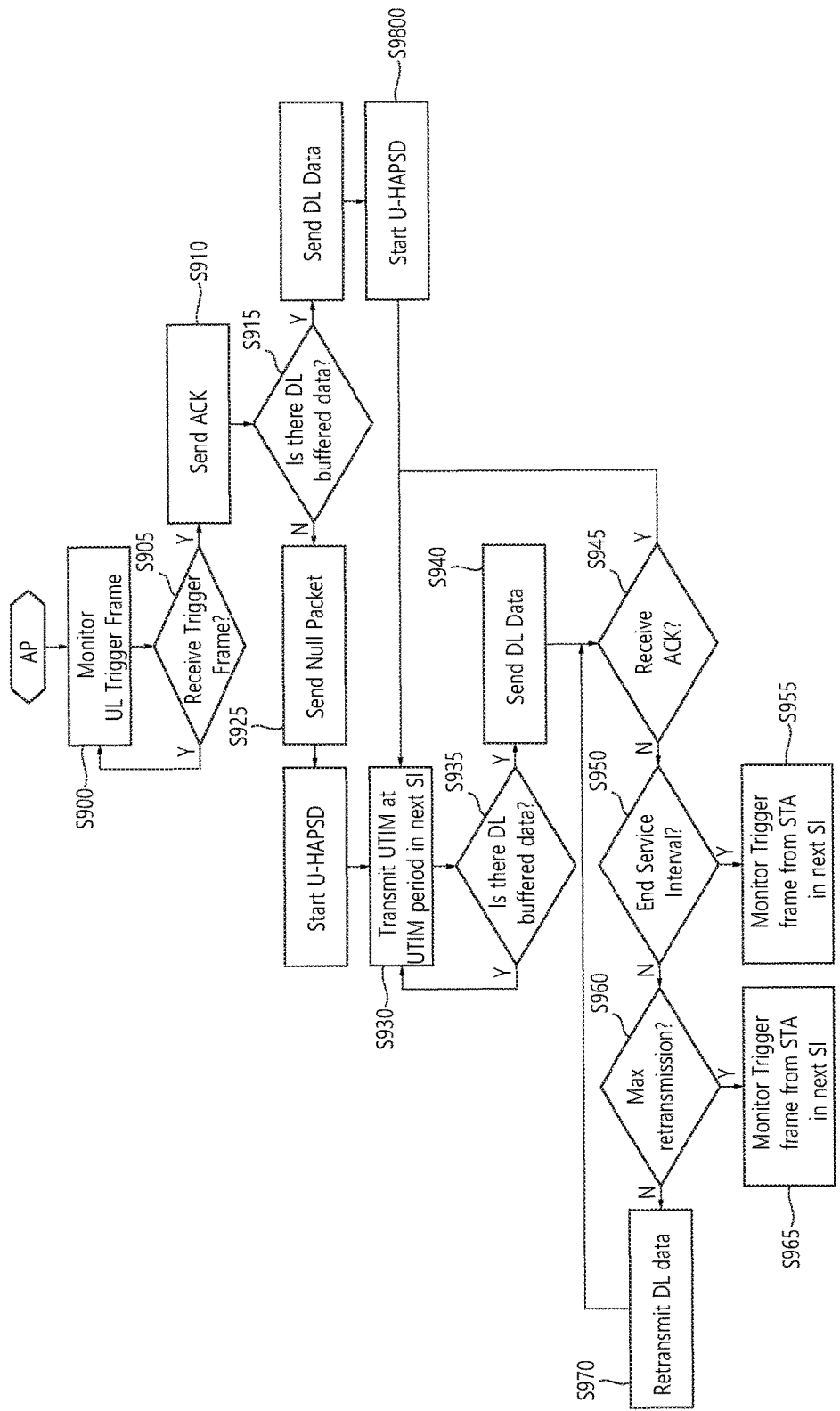
FIG. 9 is a conceptual view illustrating an operation of an AP using U-HAPSD according to an embodiment of the present invention.

FIG. 9 is a conceptual view illustrating an operation of an AP using U-HAPSD according to an embodiment of the present invention.

Referring to FIG. 9, the AP may monitor a trigger frame transmitted by an STA in a U-HAPSD initiation service interval (step S900).

When the trigger frame is received in the U-HAPSD initiation service interval (step S905), the AP may transmit an ACK frame to the STA in response to the trigger frame (step S910).

The AP may determine whether there is pending downlink data (or buffered downlink data) to transmit to the STA (step S915).

When there is pending downlink data to transmit to the STA, the AP may transmit the downlink data to the STA through a downlink frame in the U-HAPSD initiation service interval (step S920).

When there is no pending downlink data to transmit to the STA (step S915), the AP may transmit may transmit a null data packet to the STA in the U-HAPSD initiation service interval (step S925). The null data packet may be an MAC service data unit (MSDU) of an MAC protocol data unit (MPDU) excluding an MAC header.

When the downlink frame (downlink data) transmitted by the AP is received in the U-HAPSD initiation service interval, the STA may determine a service interval subsequent to the U-HAPSD initiation service interval as a U-HAPSD implementation service interval to monitor a UTIM. That is, the AP may transmit the null data packet to the STA and receive an ACK frame of the null data packet in the U-HAPSD initiation service interval, and may determine the service interval subsequent to the U-HAPSD initiation service interval as the U-HAPSD implementation service interval to transmit the UTIM (step S930).

UTIM information transmitted by the AP may include information indicating whether there is downlink data for the STA to receive in the U-HAPSD implementation service interval.

When the AP has no pending downlink data to transmit to the STA (step S935), the AP may transmit a UTIM frame again in a next U-HAPSD implementation service interval (step S930).

When the AP has pending downlink data to transmit to the STA (step S935), the AP may transmit a downlink frame including the downlink data to the STA after transmitting the UTIM frame (step S940). After transmitting the downlink frame, the AP may retransmit the downlink frame depending on whether an ACK frame of the downlink frame is transmitted.

When the AP receives the ACK frame of the downlink frame (step S945) and has an additional downlink frame to further transmit to the STA, the AP may transmit the additional downlink frame. When the AP receives the ACK frame of the downlink frame and has no additional downlink frame to further transmit to the STA, the current U-HAPSD implementation service interval expires and the AP may transmit a UTIM frame again in a next U-HAPSD implementation service interval.

When the AP receives no ACK frame of the downlink frame (step S945), the AP may retransmit the downlink frame. As described above, when the U-HAPSD implementation service interval does not end (step S950) or retransmission is not performed a maximum number of retransmission times (step S960), the AP may retransmit the downlink frame to the STA (step S970).

When the U-HAPSD implementation service interval ends or retransmission is performed a maximum number of retransmission times (step S960), the AP may set a next service interval as a U-HAPSD initiation service interval to monitor a trigger frame transmitted from the STA. When the trigger frame is transmitted from the STA (steps S955 and S965), the AP may retransmit the downlink frame.

Figure 10:
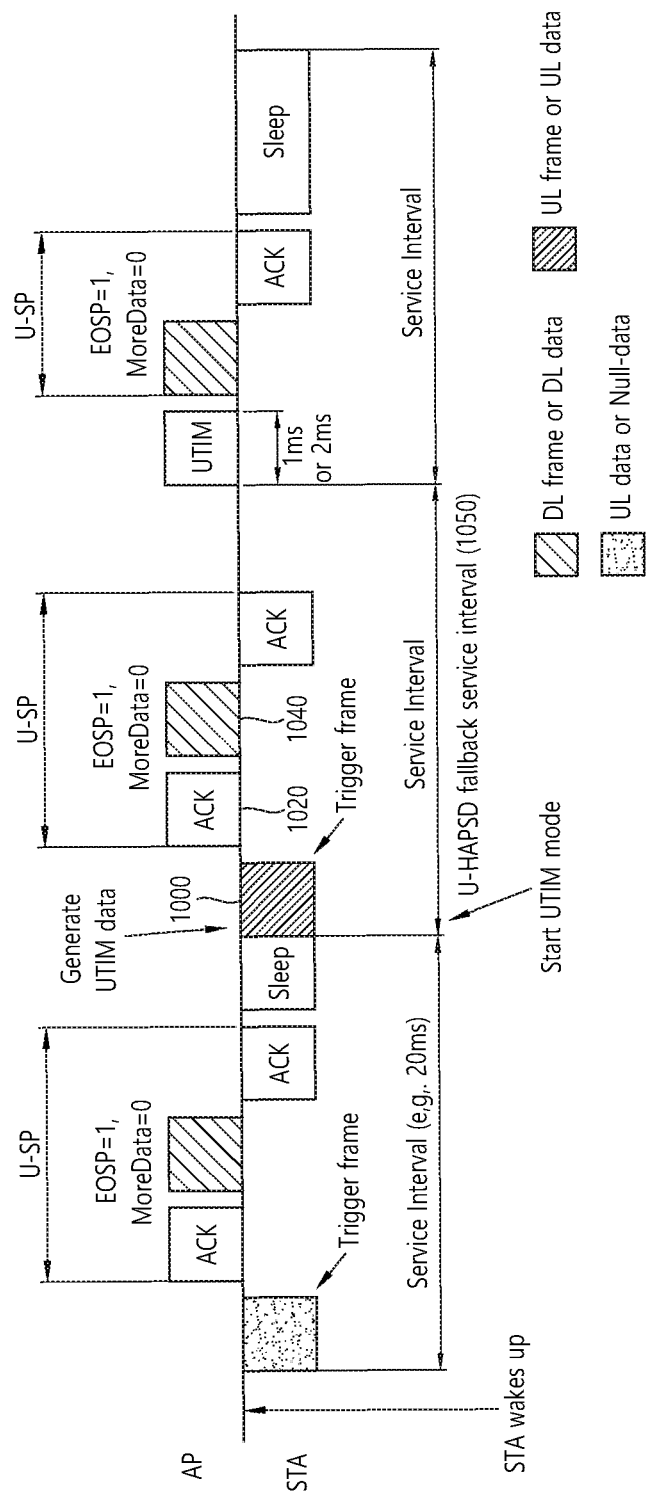
FIG. 10 is a conceptual view illustrating an uplink data transmission method of an STA according to an embodiment of the present invention.

FIG. 10 is a conceptual view illustrating an uplink data transmission method of an STA according to an embodiment of the present invention.

FIG. 10 illustrates a method in which the STA transmits an uplink frame 1000 including uplink data to an AP when the STA has the pending uplink data in a U-HAPSD implementation service interval. Specifically, FIG. 10 illustrates a method of transmitting the uplink frame 1000 in a case where uplink data is generated and pending in the STA before receiving a UTIM.

Referring to FIG. 10, the STA may preferentially transmit the uplink frame 1000 including the pending data in a service interval as in a U-HAPSD initiation service interval. A service interval in which the STA transmits the uplink frame 1000 may be referred to as a U-HAPSD fallback service interval 1050.

In the U-HAPSD fallback service interval 1050, the STA may perform channel access to transmit the uplink frame 1000 to the AP more quickly than in a UTIM transmission timing.

The AP receiving the uplink frame 1000 from the STA may transmit an ACK frame 1020 of the uplink frame 1000 to the STA. When there is pending downlink data to transmit to the STA, the AP may transmit a downlink frame 1040 after transmitting the ACK frame.

Figure 11:
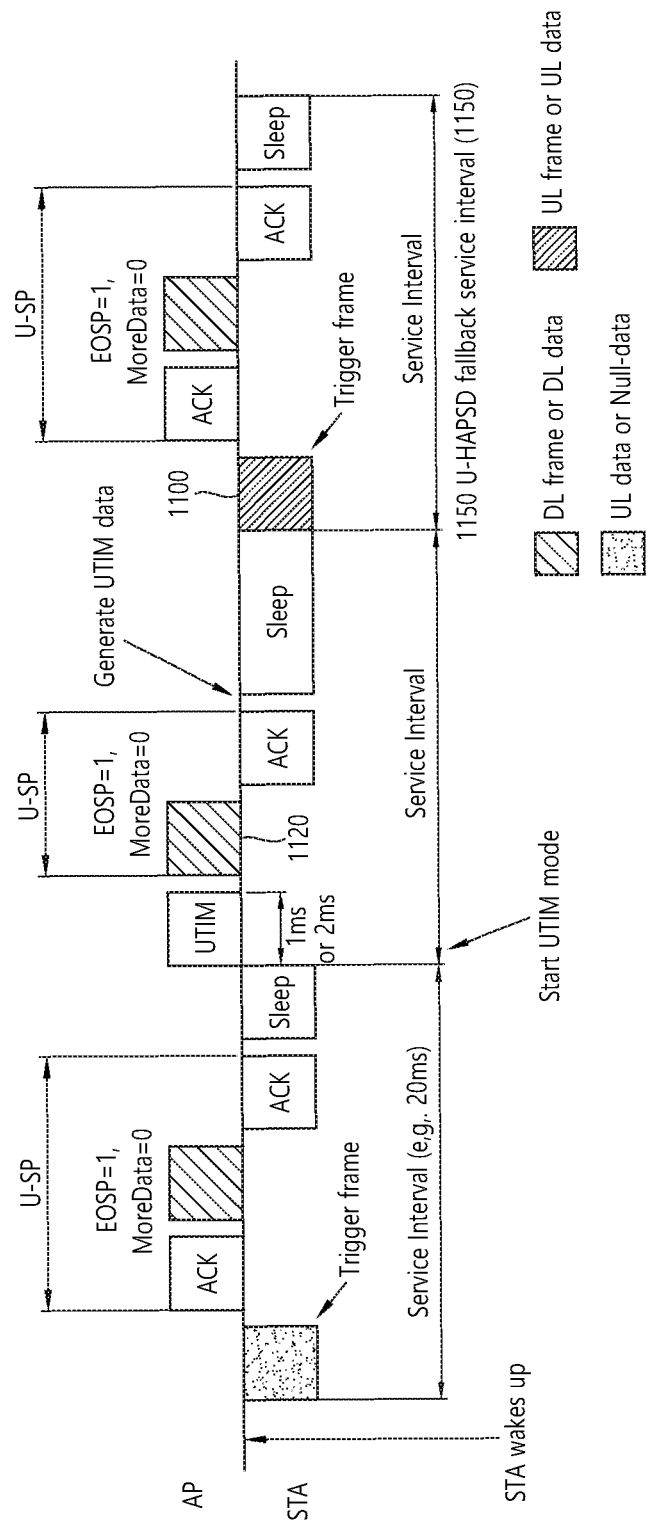
FIG. 11 is a conceptual view illustrating an uplink data transmission method of an STA according to an embodiment of the present invention.

FIG. 11 is a conceptual view illustrating an uplink data transmission method of an STA according to an embodiment of the present invention.

FIG. 11 illustrates a method in which the STA transmits an uplink frame 1100 including uplink data to an AP when the STA has the pending uplink data in a U-HAPSD implementation service interval. Specifically, FIG. 11 illustrates a method of transmitting the uplink frame 1100 in a case where uplink data is generated and pending after receiving a UTIM and a downlink frame.

Referring to FIG. 11, since EOSP included in a downlink frame 1120 transmitted from the AP is set to 1, the STA may switch to the doze state for a remaining service interval of the U-HAPSD implementation service interval. The STA may set a next U-HAPSD implementation service interval as a U-HAPSD fallback service interval 1150 and perform channel access to transmit an uplink frame more quickly than in a UTIM transmission timing.

The STA may divide characters of real-time traffic. Real-time traffic may be divided into a live video, a buffered video, an interactive video (for example, video conferencing and a voice), and the like.

The embodiment of the present invention illustrates a U-HAPSD procedure available for a real-time service. The U-HAPSD procedure may be used for an STA operating in the power saving mode.

It may be impossible to specifically distinguish real-time traffic categories according to existing access class, AC, or traffic identification (TID). That is, the existing access class, AC, or TID does not define an AC and TID to distinguish in detail real-time traffic categories, such as a live video, a buffered video, an interactive video, or a voice.

It is impossible, with the existing technology, for an STA to operate in a different power saving mode for each type of real-time traffic. The STA may not identify whether traffic from a higher-rank terminal is a live video, a buffered video, or an interactive video.

Thus, in an embodiment of the present invention, the STA may perform a method for distinguishing real-time traffic categories as follows.

First, the STA distinguishes a real-time traffic category based on a domain name. A service provided by a website corresponding to each domain may have different character, and accordingly provided real-time traffic may belong to a different category.

For example, if a domain name is www.mlbcom.com, the category of real-time traffic may be a live video. If a domain name is www.youtube.com, the category of real-time traffic may be a buffered video. If a domain name is www.google.com, the category of real-time traffic may be browsing data.

The name of a domain connected for a service may be transmitted to the STA based on MLME primitives, and the STA may distinguish the category of transmitted or received real-time traffic.

According to another embodiment of the present invention, the category of real-time traffic may be distinguished based on an operating system (OS) ID (for example, Android or iOS) or an application (APP) ID (for example, Skype or MLB TV app) in combination.

The STA may distinguish real-time traffic based on an OS ID and APP ID. For example, when the STA runs an MLB TV app, the STA may be notified of an OS ID (for example, ID indicating Android) and an APP ID (ID indicating MLB TV) via an MLME primitive, thus distinguishing transmitted and received real-time traffic.

The STA may select a power saving mode according to the category of real-time traffic. For example, the STA may use not only U-HAPSD according to the embodiments of the present invention but also one of PS-Poll, U-APSD, S-APSD, and PSMP according to the category of real-time traffic.

Figure 12:
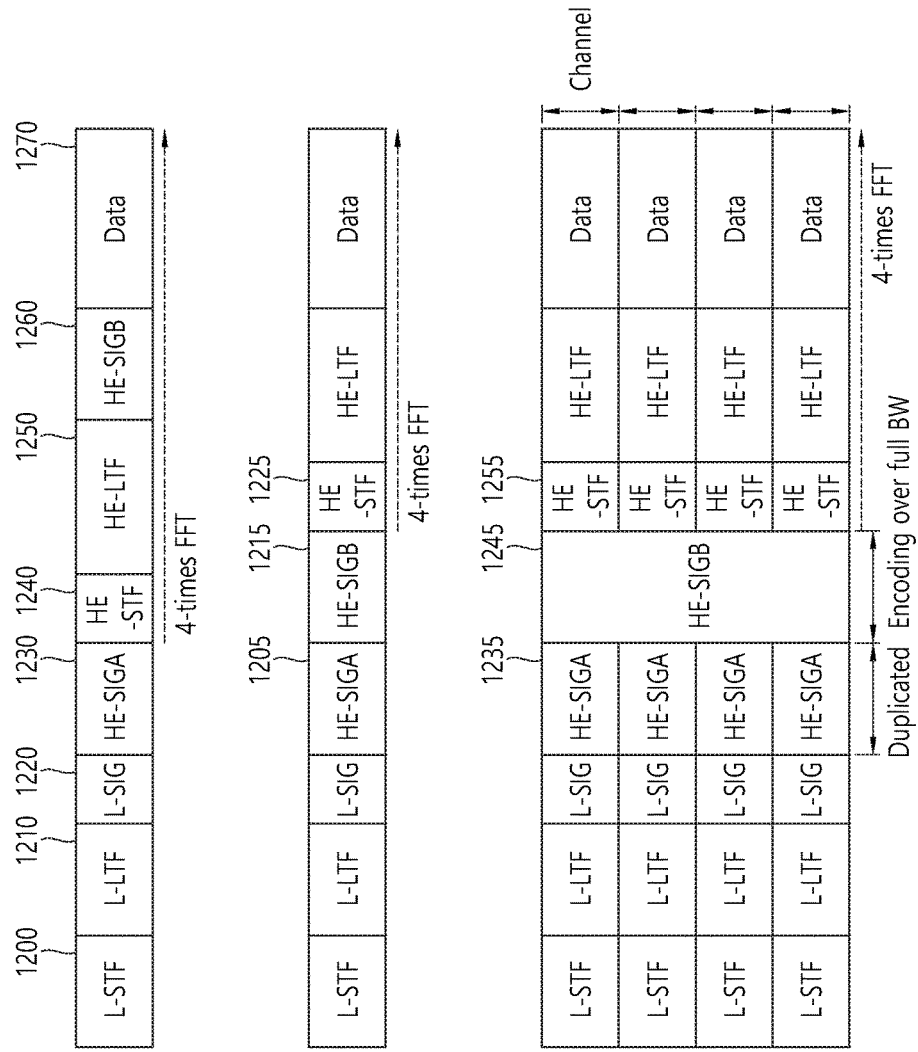
FIG. 12 is a conceptual view illustrating a format of a physical layer convergence procedure (PLCP) protocol data unit (PPDU) for transmitting a downlink frame through a downlink dedicated channel according to an embodiment of the present invention.

FIG. 12 is a conceptual view illustrating a format of a PPDU carrying a frame according to an embodiment of the present invention.

FIG. 12 illustrates a PPDU format according to an embodiment of the present invention. A PPDU header of the PPDU format may include UTIM ID information on an STA to receive a UTIM frame. The PPDU header may include a PHY header and a PHY preamble of the PPDU.

Referring to an upper part of FIG. 12, a PPDU header of a downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal-B (HE-SIG B). A legacy part may include from the PHY header to the L-SIG, and a high efficiency (HE) part may include fields after the L-SIG.

The L-STF 1200 may include a short training orthogonal frequency division multiplexing (OFDM) symbol. The L-STF 1200 may be used for frame detection, automatic gain control (AGC), diversity detection, and coarse frequency/time synchronization.

The L-LTF 1210 may include a long training OFDM symbol. The L-LTF 1210 may be used for fine frequency/time synchronization and channel estimation.

The L-SIG 1220 may be used to transmit control information. The L-SIG 1220 may include information on data rate and data length.

According to the embodiment of the present invention, the HE-SIG A 1230 may include UTIM ID information on an STA to receive a UTIM frame. Further, the HE-SIG A 1230 may include information on a UTIM transmission interval.

Alternatively, when a downlink channel is assigned to a plurality of STAs in a divided manner based on orthogonal frequency division multiplexing access (OFDMA), the HE-SIG A 1230 may include information on a downlink dedicated operation channel assigned to each of the STAs. The downlink channel may include a plurality of sub-downlink channels. For example, based on OFDMA, 20 MHz of a 40-MHz downlink channel may be assigned for a first sub-downlink channel used to transmit a downlink frame to STA 1 and remaining 20 MHz may be assigned for a second sub-downlink channel used to transmit a downlink frame to STA 2. STA 1 and STA 2 may perform U-HAPSD operations in the first sub-downlink channel and the second sub-downlink channel, respectively.

The HE-SIG A 1230 may include STA identification information to indicate a target STA to receive a downlink PPDU. A plurality of STAs may operate in the same U-HAPSD interval. In this case, the STAs may determine whether the downlink PPDU is a PPDU targeted at the STAs based on the STA identification information included in the HE-SIG A of the downlink PPDU. When an STA is indicated based on the HE-SIG A of the downlink PPDU, the STA may perform additional decoding on the downlink PPDU. The HE-STF 1240 may be used to improve automatic gain control estimation in a multiple-input and multiple-output (MIMO) environment or OFDMA environment.

The HE-LTF 1250 may be used to estimate a channel in the MIMO environment or OFDMA environment.

The HE-SIG B 1260 may include information on physical layer service data unit (PSDU) length and a modulation and coding scheme (MCS) for each STA, tail bits, and the like.

An inverse fast Fourier transform (IFFT) applied to the HE-STF 1240 and fields after the HE-STF 1240 may have a different size from an IFFT applied to fields before the HE-STF 1240. For example, the IFFT applied to the HE-STF 1240 and the fields after the HE-STF 1240 may have a size four times larger than that applied to the fields before the HE-STF 1240. When the STA receives the UTIM frame, the STA may decode the HE-SIG A 1230 of the UTIM frame and determine whether to decode fields after the HE-SIG A 1230 based on the UTIM ID information included in the HE-SIG A 1230. In this case, when the UTIM ID information included in the HE-SIG A 1230 indicates a UTIM ID of the STA, the STA may decode the HE-STF 1240 and the fields after the HE-STF 1240 based on an FFT with a modified size. However, when the UTIM ID information included in the HE-SIG A 1230 does not indicate the UTIM ID of the STA, the STA may stop decoding and set a network allocation vector (NAV). A cyclic prefix (CP) of the HE-STF 1240 may have a larger size than CPs of other fields, and the STA may decode the downlink PPDU by changing the FFT size during CP duration.

The fields of the PPDU format illustrated in the upper part of FIG. 12 may be configured in a different order. For example, as illustrated in a middle part of FIG. 12, the HE-SIG B 1215 of the HE part may be positioned immediately after the HE-SIG A 1205. The STA may decode up to the HE-SIG A 1205 and the HE-SIG B 1215, receive necessary control information, and set an NAV. Likewise, an IFFT applied to the HE-STF 1225 and fields after the HE-STF 1225 may have a different size from an IFFT applied to fields before the HE-STF 1225.

The STA may receive the HE-SIG A 1205 and the HE-SIG B 1215. When the UTIM ID in the HE-SIG A 1205 instructs the STA to receive the downlink PPDU, the STA may decode the downlink PPDU by changing an FFT size from the HE-STF 1225. However, when the STA receives the HE-SIG A 1205 and is not instructed to receive the downlink PPDU based on the HE-SIG A 1205, the STA may set an NAV.

A lower part of FIG. 12 illustrates a downlink PPDU format for downlink multi-user (MU) transmission. A downlink PPDU may be transmitted to the STA through different downlink transmission resources (frequency resources or spatial streams) based on OFDMA. That is, the downlink PPDU may be transmitted to a plurality of STAs through sub-downlink channels. This method may enable the plurality of STAs and an AP to communicate with each other based on a U-HAPSD procedure.

Fields before the HE-SIG B 1245 in the downlink PPDU may be transmitted in a duplicated form through different downlink transmission resources. The HE-SIG B 1245 may be transmitted in an encoded form on all transmission resources. Fields after the HE-SIG B 1245 may include individual information for each of a plurality of STAs receiving the downlink PPDU.

When the fields included in the downlink PPDU are transmitted through downlink transmission resources, respectively, CRCs for the respective fields may be included in the downlink PPDU. However, when a particular field in the downlink PPDU is transmitted in the encoded form on all downlink transmission resources, the CRCs for the respective fields may not be included in the downlink PPDU. Accordingly, CRC overhead may be reduced. That is, the downlink PPDU format for downlink MU transmission according to the embodiment of the present invention may use the HE-SIG B 1245 in the encoded form on all transmission resources, thereby reducing CRC overhead of a downlink frame.

For example, it may be assumed that the AP transmits a downlink PPDU through a downlink channel based on downlink multi-user (MU) OFDMA transmission. When one sub-downlink channel has a bandwidth of 20 MHz, the STA may decode the HE-SIG A 1235 transmitted through one sub-downlink channel to be assigned a downlink transmission resource. For example, the HE-SIG A 1235 may indicate that a 80-MHz downlink channel is assigned for the STA, and the STA may decode the fields after the HE-SIG A 1235 transmitted through the 80-MHz downlink channel.

In the downlink PPDU format for downlink MU transmission, the HE-STF 1255 and fields after the HE-STF 1255 may also be encoded based on a different IFFT size from that for fields before the HE-STF 1255. Thus, when the STA receives the HE-SIG A 1235 and the HE-SIG B 1245 and is instructed to receive the downlink PPDU based on the HE-SIG A 1235, the STA may decode the downlink PPDU by changing an FFT size from the HE-STF 1255.

Figure 13:
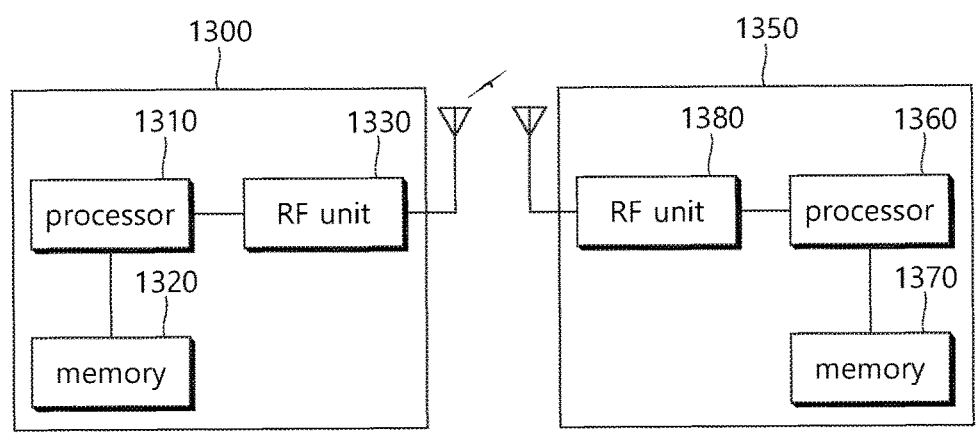
FIG. 13 is a block diagram illustrating a wireless device according to an embodiment of the present invention.

FIG. 13 is a block diagram illustrating a wireless device according to an embodiment of the present invention.

Referring to FIG. 13, the wireless device 1300 may be an STA to implement the foregoing embodiments, which may be an AP 1300 or a non-AP STA (or STA) 1350.

The AP 1300 includes a processor 1310, a memory 1320, and a radio frequency (RF) unit 1330.

The RF unit 1330 may be connected to the processor 1310 to transmit/receive a radio signal.

The processor 1310 may implement functions, processes and/or methods suggested in the present invention. For example, the processor 1310 may be configured to perform operations of a wireless device according to the foregoing embodiments of the present invention. The processor may perform operations of a wireless device illustrated in the embodiments of FIGS. 2 to 12.

For example, the processor 1310 may be configured to transmit a pending downlink frame to an STA based on a trigger frame received from the STA in a first service interval. Further, the processor 1310 may be configured to transmit a UTIM to the STA and to transmit a pending downlink frame to the STA in the presence of the pending frame in a second service interval.

The STA 1350 includes a processor 1360, a memory 1370, and an RF unit 1380.

The RF unit 1380 may be connected to the processor 1360 to transmit/receive a radio signal.

The processor 1360 may implement functions, processes and/or methods suggested in the present invention. For example, the processor 1360 may be configured to perform operations of a wireless device according to the foregoing embodiments of the present invention. The processor may perform operations of a wireless device illustrated in the embodiments of FIGS. 2 to 12.

For example, the processor 1360 may be configured to transmit a first trigger frame to an AP in a first service interval and to receive a downlink frame transmitted by the AP based on the first trigger frame in the first service interval. Further, the processor 1360 may be configured to receive traffic indication information from the AP in a second service interval after receiving the downlink frame, to determine whether the AP has a pending downlink frame based on the traffic indication information in the second service interval, and to determine a power state based on whether the AP has the pending downlink frame. The traffic indication information may include information on the presence of the pending downlink frame to be transmitted by the AP in the second service interval.

The processors 1310 and 1360 may include an application-specific integrated circuit (ASIC), other chipsets, a logic circuit, a data processor and/or a converter to convert a baseband signal and a radio signal from one to the other. The memories 1320 and 1370 may include a read-only memory (ROM), a random access memory (RAM), a flash memory, a memory card, a storage medium and/or other storage devices. The RF units 1330 and 1380 may include at least one antenna to transmit and/or receive a radio signal.

When the embodiments are implemented with software, the foregoing techniques may be implemented by a module (process, function, or the like) for performing the foregoing functions. The module may be stored in the memories 1320 and 1370 and be executed by the processors 1310 and 1360. The memories 1320 and 1370 may be disposed inside or outside the processors 1310 and 1360 or be connected to the processors 1310 and 1360 via various well-known means.

What is claimed is:

1. An operation method based on a power saving mode in a wireless local area network (WLAN), the method comprising:
    transmitting, by a station (STA), a first trigger frame to an access point (AP) in a first service interval,
    wherein the first trigger frame triggers downlink transmission by the AP;
    receiving, by the STA in the first service interval, a downlink frame transmitted by the AP in response to the first trigger frame;
    after receiving the downlink frame in the first service interval, receiving, by the STA in a second service interval and without transmitting a corresponding second trigger frame, traffic indication information from the AP,
    wherein the traffic indication information indicates a presence of at least one pending downlink frame buffered by the AP for at least one STA;
    determining, by the STA, whether there is a pending downlink frame for the STA buffered by the AP based on the traffic indication information received in the second service interval; and
    determining, by the STA, a mode for power saving based on whether there is the pending downlink frame.

2. The method of claim 1, wherein the determining of the mode for power saving comprises:
    switching, by the STA, the mode from an active mode to a sleep mode when there is no pending downlink frame; and
    maintaining, by the STA, the mode as the active mode and monitoring the pending downlink frame when there is the pending downlink frame.

3. The method of claim 1, further comprising:
    transmitting, by the STA, the second trigger frame when the STA does not receive the pending downlink frame from the AP within a certain period of time after the traffic indication information is received, wherein the second trigger frame triggers transmission of the pending downlink frame by the AP in the second service interval.

4. The method of claim 3, further comprising:
    monitoring, by the STA, the pending downlink frame in view of a maximum retransmission interval after transmitting the second trigger frame, wherein the maximum retransmission interval is a maximum time interval in which retransmission of the pending downlink frame is performed, and the maximum retransmission interval is to end of the second service interval.

5. The method of claim 4, further comprising:
    transmitting, by the STA, a third trigger frame to the AP in a third service interval when the STA does not receive the pending downlink frame in the maximum retransmission interval, wherein the third trigger frame triggers transmission of the pending downlink frame by the AP in the third service interval.

6. A station (STA) operating based on a power saving mode in a wireless local area network (WLAN), the STA comprising:
    a radio frequency (RF) unit configured to transmit or receive a radio signal; and
    a processor operatively connected to the RF unit,
    wherein the processor is configured to:
        transmit a first trigger frame to an access point (AP) in a first service interval,
        wherein the first trigger frame triggers downlink transmission by the AP;
        receive, in the first service interval, a downlink frame transmitted by the AP in response to the first trigger frame;
        after receiving the downlink frame in the first service interval, receive, in a second service interval and without transmitting a corresponding second trigger frame, traffic indication information from the AP,
        wherein the traffic indication information indicates a presence of at least one pending downlink frame buffered by the AP for at least one STA;
        determine whether there is a pending downlink frame for the STA buffered by the AP based on the traffic indication information received in the second service interval; and
        determine a mode for power saving based on whether there is the pending downlink frame.

7. The STA of claim 6, wherein the processor is configured to switch the mode from an active mode to a sleep mode when there is no pending downlink frame, and to maintain the mode as the active mode and to monitor the pending downlink frame when there is the pending downlink frame.

8. The STA of claim 6, wherein the processor is configured to transmit the second trigger frame when the STA does not receive the pending downlink frame from the AP within a certain period of time after the traffic indication information is received, and the second trigger frame triggers transmission of the pending downlink frame by the AP in the second service interval.

9. The STA of claim 8, wherein the processor is configured to monitor the pending downlink frame in view of a maximum retransmission interval after transmitting the second trigger frame, the maximum retransmission interval is a maximum time interval in which retransmission of the pending downlink frame is performed, and the maximum retransmission interval is to end of the second service interval.

10. The STA of claim 9, wherein the processor is configured to transmit a third trigger frame to the AP in a third service interval when the STA does not receive the pending downlink frame in the maximum retransmission interval, and the third trigger frame triggers transmission of the pending downlink frame by the AP in the third service interval.

* * * * *